(12) United States Patent
Shinmei

(10) Patent No.: US 7,349,707 B2
(45) Date of Patent: Mar. 25, 2008

(54) WIRELESS COMMUNICATION APPARATUS WITH RELATIVE DISTANCE ESTIMATION MEANS

(75) Inventor: Hideaki Shinmei, Funabashi (JP)

(73) Assignee: Sharp Kabushiki Kaisha (JP)

( * ) Notice: Subject to any disclaimer, the term of this patent is extended or adjusted under 35 U.S.C. 154(b) by 184 days.

(21) Appl. No.: 10/822,577

(22) Filed: Apr. 12, 2004

(65) Prior Publication Data
US 2004/0214565 A1    Oct. 28, 2004

(30) Foreign Application Priority Data
Apr. 25, 2003    (JP) .............................. 2003-122809

(51) Int. Cl.
*H04Q 7/20* (2006.01)
(52) U.S. Cl. .............................. 455/456.1; 455/456.2; 455/456.5; 455/9; 455/67.11; 455/115.3; 455/522; 342/357.1; 370/318
(58) Field of Classification Search .. 455/456.1–456.6, 455/13.4, 522, 9, 67.11, 115.3; 342/357.09, 342/357.01, 357.1; 370/318
See application file for complete search history.

(56) References Cited

U.S. PATENT DOCUMENTS

| | | | | |
|---|---|---|---|---|
| 5,668,977 | A | 9/1997 | Swanstrom et al. | 395/500 |
| 5,963,866 | A * | 10/1999 | Palamara et al. | 455/456.5 |
| 6,028,851 | A * | 2/2000 | Persson et al. | 370/329 |
| 6,353,743 | B1 * | 3/2002 | Karmel | 455/456.5 |
| 6,414,635 | B1 * | 7/2002 | Stewart et al. | 342/457 |
| 6,453,168 | B1 * | 9/2002 | McCrady et al. | 455/517 |
| 6,745,038 | B2 * | 6/2004 | Callaway et al. | 455/456.1 |
| 6,845,239 | B1 * | 1/2005 | Sato et al. | 455/456.1 |
| 2003/0043073 | A1 * | 3/2003 | Gray et al. | 342/465 |

FOREIGN PATENT DOCUMENTS

| | | |
|---|---|---|
| JP | 1997-247737 | 9/1997 |
| JP | 11-163797 | 6/1999 |
| JP | 2001-331429 | 11/2001 |
| JP | 2002-057657 | 2/2002 |
| JP | 2002-135195 | 5/2002 |
| JP | 2002-264431 | 9/2002 |
| JP | 2002-320257 | 10/2002 |
| JP | 2002-007242 | 11/2002 |
| JP | 2002-007525 | 11/2002 |
| JP | 2003-23367 | 1/2003 |

* cited by examiner

*Primary Examiner*—William Trost
*Assistant Examiner*—Ariel Balaoing
(74) *Attorney, Agent, or Firm*—David G. Conlin; George N. Chaclas; Edwards Angell Palmer & Dodge LLP

(57) ABSTRACT

A wireless communications system including a mobile terminal and a mobile receiver. The receiver includes: a reception level acquisition section for acquiring reception levels of wireless signals, wherein the reception level acquisition section measures the reception levels of signals; a transmission level acquisition section for acquiring transmission levels of the terminal, wherein the transmission level acquisition section retrieves transmission levels of the terminal contained in signals; a difference value calculation section for calculating respective difference values between the transmission levels and the reception levels; and relative distance estimation section for estimating a relative distance to the terminal in accordance with the respective difference values. The reception level acquisition section retrieves reception levels of signals sent from the wireless communications apparatus to the terminal contained in signals of the terminal; and the transmission level acquisition section measures a transmission level of the wireless communications apparatus to the terminal.

19 Claims, 10 Drawing Sheets

WIRELESS COMMUNICATION APPARATUS WITH RELATIVE DISTANCE ESTIMATION MEANS

This Nonprovisional application claims priority under 35 U.S.C. § 119(a) on Patent Application No. 2003/122809 filed in Japan on Apr. 25, 2003, the entire contents of which are hereby incorporated by reference.

FIELD OF THE INVENTION

The present invention relates to a wireless communications apparatus and a wireless communications system which can estimate a relative distance between wireless terminals in the wireless communications system free of fixed base stations.

BACKGROUND OF THE INVENTION

Currently, a wireless mobile communications system having fixed base stations, such as PHS (personal handyphone system®), has been in common use. Such a wireless mobile communications system realizes a function of detecting a position of a mobile terminal by referring to a positional information database of a fixed base station, taking advantage of the feature of a small wireless zone. Examples of a document disclosing this wireless mobile communications system include patent document 1 (Japanese Laid-Open Patent Application No. 9-247737/1997 (Tokukaihei 9-247737; published on Sep. 19, 1997)).

FIG. 12 shows a positional information detection system described in the above document. This positional information detection system includes: a mobile terminal 101, base stations 102a through 102d, respective wireless zones 103a through 103d for the base stations 102a through 102d, a general call area 104, a control station 105, respective telecommunications line connections 106a through 106d between the control station 105 and the base stations 102a through 102d, and a position management station 109. The base stations 102a through 102d register a calling area and a paging area with respect to the mobile terminal 101. The general calling area 104 consists of a plurality of wireless zones 103a through 103d. Sets of base station identification information 107a through 107d are issued respectively from the base stations 102a through 102d. The control station 105 controls line connections of the base stations 102a through 102d, with respect to the mobile terminal 101, respectively in the wireless zones 103a through 103d and is connected with a position management station 109 via a line 108.

Upon receipt of the sets of base station identification information 107a through 107d transmitted periodically from the base stations 102a through 102d, the mobile terminal 101 causes a control section to store positional information in a memory. The positional information is combined data of a reception electrical field value greater than a predetermined threshold value, which is measured by a reception electrical field strength measurement section, and base station identification information 107a, 107b, 107c, or 107d corresponding to the reception electrical filed value. Then, when a required number of sets of positional information to determine the position of the mobile terminal 101 is collected, the mobile terminal 101 performs transmission to a base station 102 (any one of 102a, 102b, 102c and 102d). A signal for positional information transmitted from the mobile terminal 101 is received by any of the base stations 102, and the base station 102 having received the signal transmits the signal to the position management station 109 via the control station 105. The position management station 109 refers to a database in accordance with the positional information acquired by demodulating the signal transmitted so as to determine a position of the mobile terminal 101.

In this manner, the wireless mobile communications system having fixed base stations can determine a current position of a mobile terminal by analyzing positional information data from a plurality of base stations in accordance with a reception electric strength information.

Meanwhile, a wireless mobile communications system free of fixed base stations, such as a specified low-power radio system disclosed in patent document 2 (Japanese Laid-Open Patent Application No. 2002-7525 (Tokukai 2002-7525; published on Jan. 11, 2002)), IrDA as disclosed in patent document 3 (U.S. Pat. No. 5,668,977 (published on Sep. 16, 1997)), IEEE802.11a as disclosed in patent document 4 (Japanese Laid-Open Patent Application No. 2002-57657 (Tokukai 2002-57657 (published on Feb. 22, 2002)), IEEE802.11b as disclosed in patent document 5 (Japanese Laid-Open Patent Application No. 2001-331429 (Tokukai 2001-331429 (published on Nov. 30, 2001)), and Bluetooth® as disclosed in patent document 6 (Japanese Laid-Open Patent Application No. 2002-7242 (Tokukai 2002-7242; published on Jan. 11, 2002)), are demanded to detect a position of a mobile terminal.

However, such a wireless mobile communications system free of fixed base stations cannot determine a relative distance between mobile terminals. This would cause a problem such as connection with a far, unintended terminal having a high transmission level regardless of the presence of a close terminal to be connected, misconnection with an unintended terminal because of the presence of a plurality of unintended terminals having the same transmission level as that of an intended terminal, and interceptions of communications data due to an unintended connection by a third party.

SUMMARY OF THE INVENTION

An object of the present invention is to provide a wireless communications apparatus and a wireless communications system which can estimate a relative distance between mobile terminals, for connection with a desired terminal, in the wireless mobile communications system free of fixed base stations.

In order to achieve the above object, a wireless communications apparatus of the present invention has an arrangement including: data processing section (reception level acquisition means) for acquiring respective reception levels of wireless signals transmitted from at least one mobile terminals; and relative distance estimation section (relative distance estimation means) for estimating a relative distance to the mobile terminal in accordance with the reception level.

With this arrangement, the wireless communications apparatus can estimate a relative distance between mobile terminals. This brings about the effect of easily determining a close mobile terminal to be connected among a plurality of mobile terminals of the same type.

The foregoing wireless communications apparatus further includes: a data processing section (transmission level acquisition means) for acquiring respective transmission levels of the mobile terminals; and a control section (difference value calculation means) for calculating respective difference values between the transmission levels and the reception levels, wherein: the relative distance estimation section (relative distance estimation means) estimate a relative distance with respect to the mobile terminal in accordance with the difference value, instead of the reception level. This brings about the effect of easily determining a close mobile terminal to be connected among a plurality of mobile terminals of the different types.

Therefore, according to the foregoing wireless communications apparatus, it is possible to selectively realize connection to a particular mobile terminal, maintaining of the connected state, cancellation of the connection, and other operation in accordance with a relative distance to the estimated mobile terminal.

Especially, a technique described in the patent document 1 is applied to a wireless mobile communications system which needs fixed base stations, such as PHS®, and assumes the presence of fixed base stations. On the contrary, an object of a wireless communications apparatus according to the present invention is to detect a relative distance to a mobile terminal in a wireless mobile communications system free of fixed base stations, such as Bluetooth®, IEEE802.11a, IEEE802.11b, IrDA, and a specific low-power radio system. Further, in the wireless communications apparatus of the present invention, in the case where there are three or more mobile terminals, it is possible to detect their relative positions in accordance with the relative distance to one another. Further, in a wireless communications apparatus of the present invention, in the case where there is position-fixed terminal (which is not necessary to be a fixed base station), it is possible to determine an absolute position with respect to the fixed terminal.

For a fuller understanding of the nature and advantages of the invention, reference should be made to the ensuing detailed description taken in conjunction with the accompanying drawings.

DESCRIPTION OF THE EMBODIMENTS

The following will describe one embodiment of the present invention with reference to FIGS. 1 through 10.

Figure 1:
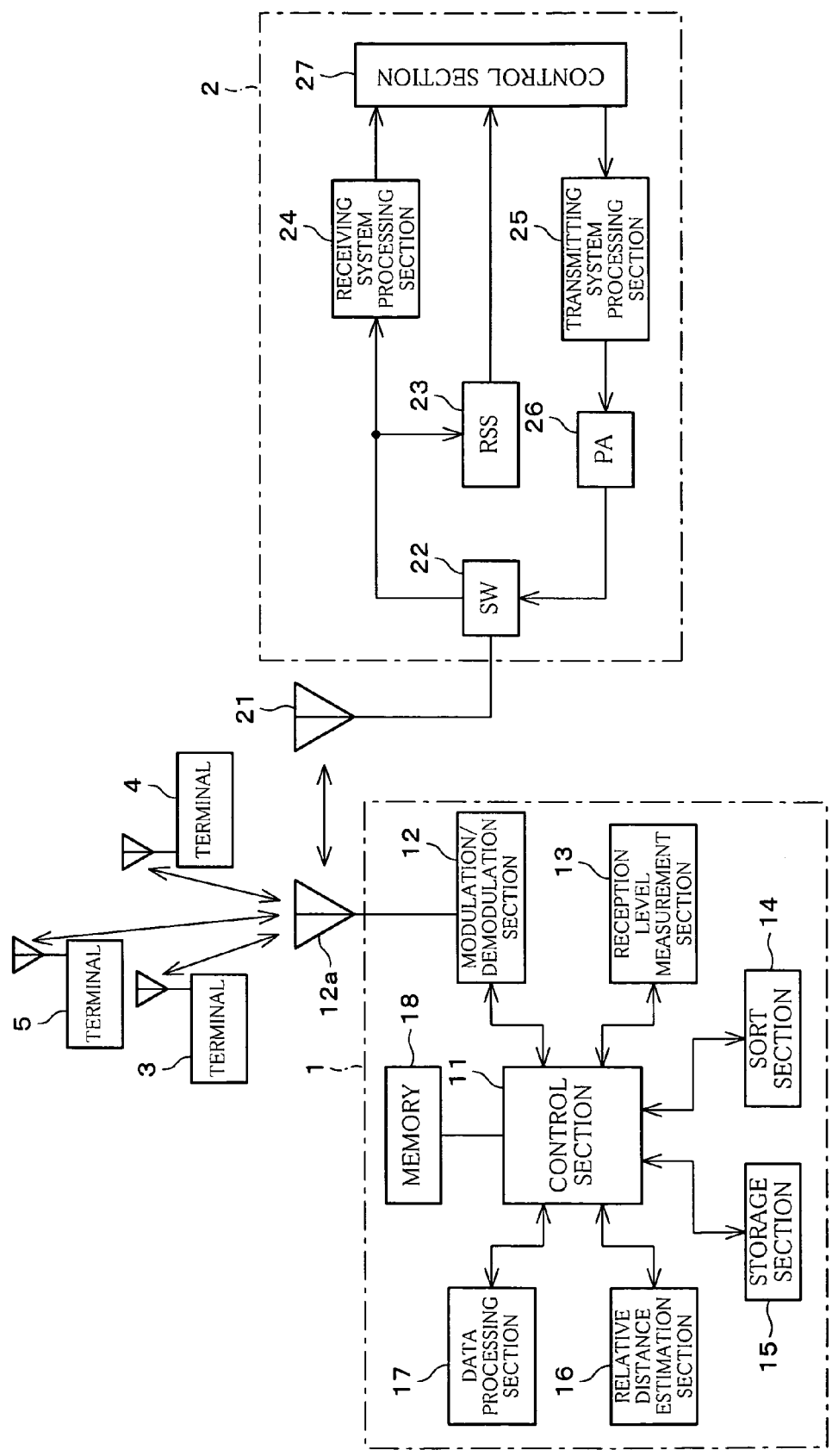
FIG. 1 is a block diagram showing a configuration of a wireless communications system according to one embodiment of the present invention.

FIG. 1 shows a schematic configuration of a wireless communications system of the present embodiment.

As shown in FIG. 1, the wireless communications system of the present embodiment includes a terminal 1 as a first terminal and a plurality of terminals 2 through 5 as second terminals.

To begin with, the following will describe the terminal 1 as a wireless communications apparatus. The terminal 1 has a control section 11, a modulation/demodulation section 12, a reception level measurement section 13, a sort section 14, a storage section 15, a relative distance estimation section 16, a data processing section 17, and a memory 18.

The control section 11, which is realized by a control circuit such as CPU (Central Processing Unit) or DSP (Digital Signal Processor), controls the operations of the members 12 through 18. For example, the control section 11 performs turning-on/off of the members, maintaining of synchronization between the members, and controlling of delivery of data between function blocks.

The modulation/demodulation section 12 has an antenna 12$a$, an amplifier, and a transmission and reception components such as RF components, which are not shown. For data transmission and reception to and from a second terminal, the modulation/demodulation section 12 performs data processing for transmission and reception, including modulation of transmission data, demodulation of reception data, and transmission switching, in accordance with a control signal sent from the control section 11.

The reception level measurement section 13 as reception level acquisition means measures reception levels of transmission signals received from the terminals 2 through 5 via the modulation/demodulation section 12. A result of the measurement is stored in the storage section 15 by the control section 11.

The sort section 14, as reception level sort means and difference value sort means, sorts the later-described IDs for the terminals 2 through 5 stored in the storage section 15, reception level values measured by the reception level measurement section 13, transmission level values and reception level values contained in data received from the terminals 2 through 5, and difference values between the transmission levels and the reception levels in the order of level strength in accordance with a sort key provided by the control section 11, and stores a result of the sorting in the storage section 15. A sorting function of the sort section 14 will be described later.

The storage section 15, which is storage means for storing dynamically changing second terminal information, stores IDs of the terminals 2 through 5 (second terminals), "a transmission level value of the second terminal" and "a reception level value of the second terminal" which are contained in information transmitted from the second terminal and received by the modulation and demodulation section 12, a reception level value outputted by the reception level measurement section 13, respective transmission level values and respective reception level values of the first terminal and second terminals which are results processed by the sort section 14, and a relative distance information which is a result estimated by the relative distance estimation section 16. Further, the storage section 15 stores a predetermined transmission level of the terminal 1. With this arrangement, the storage section 15 functions as transmission level acquisition means.

The IDs are identification codes unique to the terminals 2 through 5 to identify the terminals 2 through 5. Even with only one second terminal to be connected, previous storage of an ID for the second terminal in the storage section 15 enables identification of a connected terminal as a telephone directory function of a portable telephone, and particularly in the case of connection with a particular terminal at all times, enables omission or simplification of verification operation.

The relative distance estimation section 16 as relative distance estimation means estimates a relative distance to the second terminal in accordance with a reception level value and a transmission level value which are stored in the storage section 15. Generally, it is known that the relationship between a reception electrical strength V in wireless communications and a distance D from a transmitter to a receiver satisfies the following equation:

$$D = A \cdot V^{-B} \text{ (A, B are factors).}$$

As mentioned previously, in a system having fixed base stations, the base station measures a distance to a terminal by receiving reception electrical strength information of the terminal and determines a position of the terminal by referring to a position database. With this arrangement, if a reception level is known, a distance between the terminal and base station can be calculated.

In the wireless communications system according to the present embodiment, the relative distance estimation section 16 estimates a relative distance to the second terminal on the basis of the above calculation, regarding, as an electrical strength, the level difference value obtained from acquired transmission level value and reception level value, or a reception level value of the terminal 1.

The data processing section 17 performs communications data processing in accordance with various communications protocols. For example, the data processing section 17 performs a process of assembling packets to be transmitted to the terminals 2 through 5 and a process of retrieving transmission data from packets transmitted from the terminals 2 through 5. The data processing section 17, which retrieves respective transmission levels, reception levels, and IDs of the terminals 2 through 5 from the transmission data, has functions as transmission level acquisition means, reception level acquisition means, and identification code acquisition means. Moreover, the data processing section 17, which writes a transmission level, a reception level, and an ID of the terminal 1 into transmission data which is transmitted from the terminal 1, has functions as transmission level writing means, reception level writing means, and identification code writing means. Further, the data processing section 17 as difference value calculation means subtracts the after-mentioned reception level measured by the reception level measurement section 13 from the transmission levels of the terminals 2 through 5 to obtain difference values (level difference values) between the transmission levels and the reception levels, and stores the obtained difference values in the storage section 15.

The memory 18 has a program for causing the control section 11 to control the members 12 through 17, and ROM (read only memory) and flash memory to store therein fixed data including the ID of the terminal 1. In the case where the terminal 1 can access to Ethernet®, the fixed data contains MAC (media access control) address of the terminal 1. Further, the memory 18 has a recordable flash memory or SRAM (static random access memory) and DRAM (dynamic random access memory) to temporarily store values that can be changed for each connection, such as IP (Internet protocol) address for Ethernet® and ID information for the terminals 2 through 4.

Next, the following will describe the terminals 2 through 5. Note that, the terminals 3, 4, and 5 have the same arrangements as that of the terminal 2 and explanations thereof are omitted here.

The terminal 2 has an antenna 21, a transmission and reception selection switch ("SW" in FIG. 1) 22, a reception signal strength measurement section ("RSSM" in FIG. 1) 23, a receiving system processing section 24, a transmitting system processing section 25, a transmission power amplification-use amplifier (PA in FIG. 1) 26, and a control section 27. In the terminal 2, means for acquiring the transmission level and reception level described below is a technique practically adopted for PHS®.

The transmission and reception changeover switch 22 is a switch to change connections of the transmitting system circuit and the receiving system circuit to the antenna 21 upon transmission and reception.

The receiving system circuit contains the reception signal strength measurement section 23, the receiving system processing section 24. The reception signal strength measurement section 23, in response to a reception signal, outputs a DC voltage, which is generally referred to as a reception signal strength indicator (RSSI), exhibiting reception electrical strength. This DC voltage, indicating a reception level value, is converted into a digital signal in an AD converter (not shown) to be provided to the control section 27. The receiving system processing section 24 retrieves reception data from a packet of a received signal (see FIG. 2) and transmits the reception data to the control section 27.

Meanwhile the transmitting system circuit includes the transmitting system processing section 25 and the transmission power amplification-use amplifier 26. The transmitting system processing section 25 modulates reception data sent from the control section 27 and outputs the modulated data to the transmission and reception changeover switch 22. Further, the transmitting system processing section 25 determines a transmission level value in accordance with the aforementioned reception level value in response to instructions from the control section 27. The transmission power amplification-use amplifier 26 amplifies the transmission signal in accordance with the determined transmission level value. When the reception level value is low, which indicates a long relative distance between the terminal 1 and the terminal 2, the transmission power amplification-use amplifier 26 increases the transmission level value. On the other hand, when the reception level value is high, which indicates a short relative distance between the terminal 1 and the terminal 2, the transmission power amplification-use amplifier 26 decreases the transmission level value. Since this processing is based on inverse proportion, the transmission level value can be determined by using an equation for making the product of two values invariant and simple reference to an incorporated table.

Note that, the present embodiment, as shown in FIG. 1, is based on the description that the arrangement of the terminal 1 is different from the arrangements of the terminals 2 through 5. However, the terminals 1 through 5 may have all of the functions of the terminals 1 and the terminals 2 through 5. This allows the terminal 1 and the terminals 2 through 5 to operate not only as a master that gives a request (e.g. connection request) or instructions but also as a slave that operates in response to the request or instructions from the master.

Figure 2:
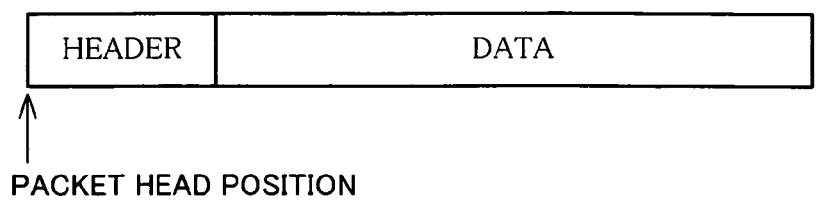
FIG. 2 is a view showing a packet which is transmitted and received between first terminal and second terminal in the wireless communications system.

FIG. 2 shows a view showing a packet transmitted and received between the terminal 1 and the terminal 2. A reception level value or a transmission level value determined as level value information in the foregoing procedure is all expressed in digital form. The transmitting system processing section 25 assembles the packet shown in FIG. 2 and writes the aforementioned level value information, as one element of transmission data, into the packet.

In the packet, a header consists of a plurality of bits and indicates information on the type of packet and the content of data. In the above example, the header includes a code indicating a transmission level value and a reception level value. Further, a data portion includes values such as the content of transmission and a transmission and reception level.

Further, the packet includes ID information for the judgment whether the terminal 1 permits connection to the terminal 2. Thus, the header includes a code indicating ID information, and the data portion includes ID information.

For one-on-one data exchange between the PC (Personal Computer) and other PC, inclusion of MAC (Media Access Control) address in the ID produces unique information. With this arrangement, in a conference system or the like using PCs, it is possible to identify the PC attending the conference.

Meanwhile, for data exchange between portable telephones or PHS®, it is possible to identify other end terminal with its telephone number. If there has been ever connection to the other end terminal in the past, it is verified whether the other end terminal is identical with the terminal connected in the past by referring to database stored in a nonvolatile memory by ID. Therefore, it is possible to determine whether or not to permit connections.

Also in the wireless communications system of the present embodiment, if the ID includes apparatus type code, it is possible to identify the other end terminal to prevent connection with an unintended apparatus. As to the apparatus type code, it is possible to identify the second terminal by unifying a code system, coding "001" to portable telephone, "002" to PDC (Personal Digital Cellular), and "003" to note PC, for example. Further, the ID may contain a vender code, a version number, a serial number, and the like, in addition to the apparatus type code.

In the wireless network environment consisting of a printer and a plurality of PCs, the following types of usage are considered: data transmission from the PC to a particular printer and a printer's permission of printing only from a particular PC. Further, the wireless communications system of the present embodiment not having fixed base stations is basically limited to the application in a limited range (up to approximately 100 m). When any region available to the user is prepared in the ID information, limited information such as employee code can be set in the region. This allows for the usage that only the terminal 2 whose owner is an employee of a company is permitted to connect to the terminal 1.

Figure 3:
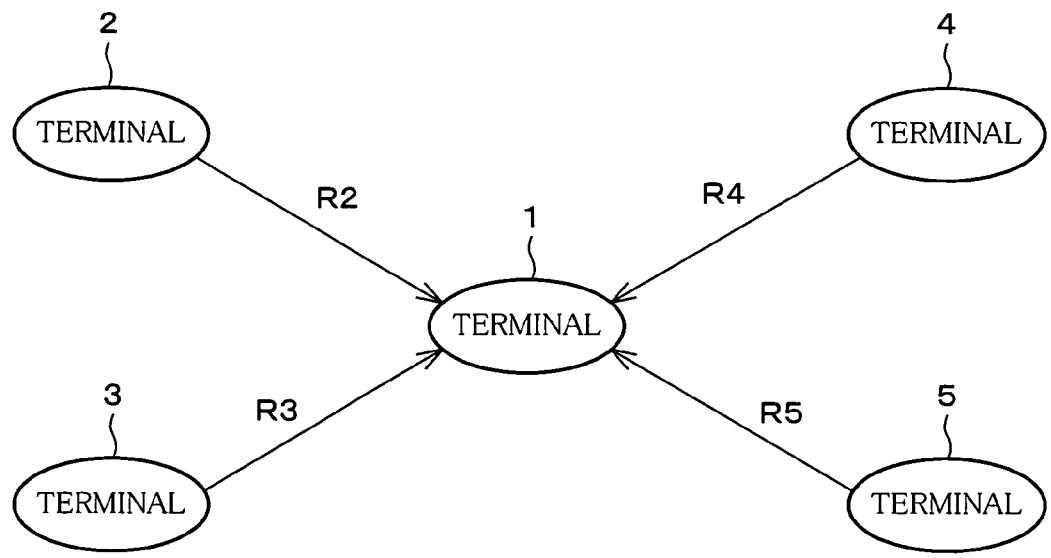
FIG. 3 is a schematic diagram showing that first terminal receives respective reception level values of second terminals in the wireless communications system.

Next, the following will describe the sort section 14 in detail with reference to FIG. 3. FIG. 3 shows a schematic diagram that the terminal 1 receives the respective reception level values of the terminals 2 through 5.

The sort section 14 sorts the respective IDs for the terminals 2 through 5, a transmission level and a reception level of the terminal 1, the foregoing transmission levels and reception levels contained in the reception data from the terminals 2 through 5, and level difference values in order in accordance with a particular sort key. Note that, for ease of explanation, IDs for the terminals are represented by the names of the terminals in FIG. 3 and Tables 1 through 3 which are shown below.

Level difference values D2 through D5, as shown in Table 1, are values respectively obtained by subtracting the respective reception levels R2 through R5 of the terminals 2 through 5 (values measured by the reception level measurement section 13) from the respective transmission levels S2 through S5 of the terminals 2 through 5. Table 1 shows sets of level information with respect to the terminals 2 through 5, which were acquired by the terminal 1, (transmission level value of the terminal 1, reception level value, and level difference value), sorting the level information in the order of terminal names.

TABLE 1

| Terminal Name | Transmission Level value of Terminal 1 | Reception Level Value | Level Difference Value |
|---|---|---|---|
| Terminal 2 | 100 (S1) | 80 (R2) | 20 (D2 = S1 − R2) |
| Terminal 3 | 100 (S1) | 50 (R3) | 50 (D3 = S1 − R3) |
| Terminal 4 | 100 (S1) | 70 (R4) | 30 (D4 = S1 − R4) |
| Terminal 5 | 100 (S1) | 40 (R5) | 60 (D5 = S1 − R5) |

The sort section 14 sorts the sets of level information in accordance with a particular sort key. Table 2 shows the result of sorting in descending order according to the reception level value used as a sort key. In the case of the terminals 2 through 5 of the same types, sorting is possible only using the reception level value as a sort key because the terminals 2 through 5 have the same transmission levels. In this case, relative positions of the terminals 2 through 5 are far from the terminal 1 in the following order: terminal 2, terminal 4, terminal 3, and terminal 5. In this case, the relative distance estimation section 16 can therefore estimate a relative distance between the terminal 1 and the terminals 2 through 5 only using the reception level value as a sort key.

On the other hand, in the case of the terminals 2 through 5 of different types, in addition to the above sorting, the terminals 2 through 5 transmit their own types to the terminal 1 so that the terminal 1 can identify the terminals 2 through 5. The types of the terminals 2 through 5 are contained, for example, in IDs, as described previously.

TABLE 2

| Result of Sorting According To Reception Level | |
|---|---|
| Terminal Name | Reception Level Value |
| Terminal 2 | 80 (R2) |
| Terminal 4 | 70 (R4) |
| Terminal 3 | 50 (R3) |
| Terminal 5 | 40 (R5) |

Further, Table 3 shows the result of sorting in descending order according to the level difference value used as a sort key. In this case, data are differences between the transmission level value of the terminal 1 and the reception level values of the terminals 2 through 5, which has nothing to do with the types of the terminals 2 through 5. Therefore, these values allow the relative distance estimation section 16 to directly estimate relative distances between the terminal 1 and the terminals 2 through 5. In this case, the relative positions of the terminals 2 through 5 are far from the terminal 1 in the following order: terminal 2, terminal 4, terminal 3, and terminal 5. Further, Tables 2 and 3 show examples of sorting in descending order; however, sorting in ascending order may be adopted for the present invention.

TABLE 3

Result of Sorting According To Level Difference Value

| Terminal Name | Level Difference Value |
| --- | --- |
| Terminal 5 | 60 (D5 = S1 − R5) |
| Terminal 3 | 50 (D3 = S1 − R3) |
| Terminal 4 | 30 (D4 = S1 − R4) |
| Terminal 2 | 20 (D2 = S1 − R2) |

Figure 4:
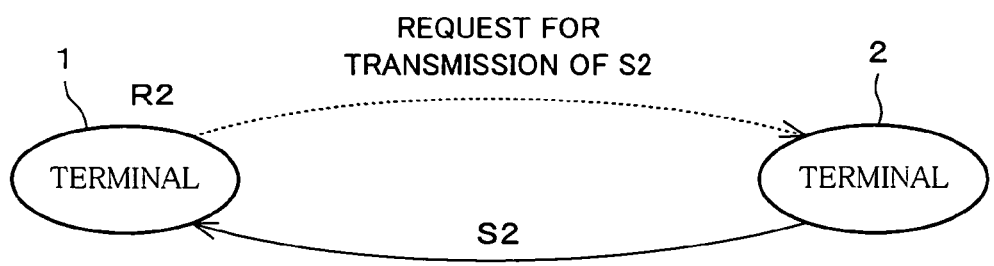
FIG. 4 is a view schematically showing a process of estimating a relative distance between first terminal and second terminal in the wireless communications system.
Figure 5:
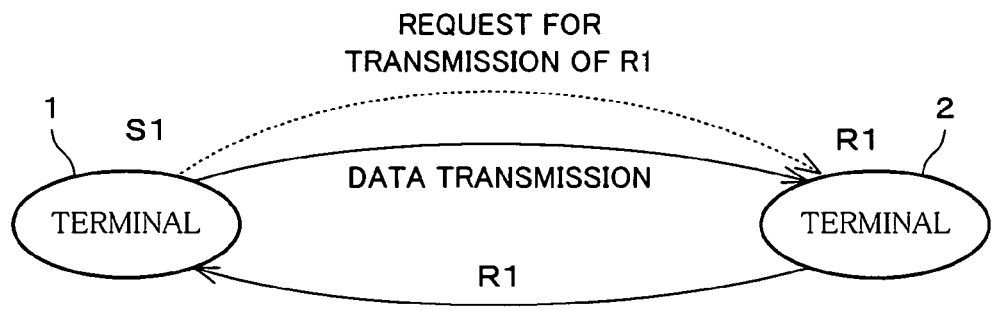
FIG. 5 is a view schematically showing another process of estimating a relative distance between first terminal and second terminal in the wireless communications system.

The following will describe specific processes of estimating a relative distance between the terminal 1 and the terminal 2 in the wireless mobile system of the present embodiment having the arrangement as described above. FIG. 4 and FIG. 5 are schematic diagrams of estimation of a relative distance between the terminal 1 and the terminal 2 according to the first and second processes.

In the first process, the terminal 1 (first terminal) estimates a relative distance to the terminal 2 (second terminal), using the transmission level contained in transmission data transmitted from the terminal 2.

As shown in FIG. 4, in response to the request made by the terminal 1 for transmission of a transmission level S2, the terminal 2 transmits its own transmission level S2 to the terminal 1. In this transmission, in the terminal 2, the transmitting system processing section 25 determines the transmission level S2 and writes the determined transmission level S2 into transmission data of the packet shown in FIG. 2, in response to instructions from the control section 27.

Upon receipt of the packet including the transmission level S2 from the terminal 2, the terminal 1 causes the data processing section 17 to retrieve the transmission data from the packet, and causes the control section 11 to store the transmission level S2 which is written into the transmission data in the storage section 15. Further, the terminal 1 causes the reception level measurement section 13 to measure a reception level R2 upon reception of the packet from the terminal 2, and causes the control section 11 to store the result of measurement. Then, according to instructions from the control section 11, the relative distance estimation section 16 obtains a level difference value D2 (=S2−R2) by subtracting the reception level R2 having been measured by the reception level measurement section 13 from the transmission level S2 of the terminal 2 having been stored in the storage section 15, and the obtained level difference value is stored in the storage section 15. For example, when the transmission level S2 is 100 and the reception level R2 is 80, the level difference value D2 of 20 is obtained by subtracting 80 from 100.

The relative distance estimation section 16 performs the foregoing calculation in accordance with the level difference value D2 to estimate a relative distance between the terminal 1 and the terminal 2.

Next, in the second process, the terminal 1 estimates a relative distance between the terminal 1 itself and the terminal 2 using a reception level contained in the transmission data transmitted from the terminal 2.

As shown in FIG. 5, the terminal 1 requests the terminal 2 to transmit a reception level S1. Upon receipt of this request, the terminal 2 causes the reception signal strength measurement section 23 to measure a reception level R1 at the reception of data from the terminal 1, and causes the transmitting system processing section 25 to write this reception level R1 into transmission data and transmits the transmission data to the terminal 1.

The terminal 1 stores the reception level R1 of the terminal 2, having been written into data in a packet that has been received from the terminal 2. The terminal 1 obtains a level difference value D1 (=S1−R1) by subtracting the reception level R1 from the given transmission level S1 having been stored in the storage section 15. For example, when S1 is 90 and R1 is 60, the level difference value D1 of 30 is obtained by subtracting 60 from 90.

The relative distance estimation section 16 performs the foregoing calculation in accordance with the level difference value D1 to estimate the relative distance between the terminal 1 and the terminal 2.

Further, the terminal 1 performs the steps of the foregoing first and second processes with the terminals 2 through 5 close to the terminal 1 in the following manner, so as to know the relative distance between the terminal 1 and the terminals 2 through 5.

When the terminal 1, which is the first terminal, desires to know the respective relative distances to the terminals 2 through 5, which are second terminals around the terminal 1, the terminal 1 receives reception levels R2 through R5 with respect to the transmission data of the terminal 1 from the terminals 2 through 5 in the second process. In this reception, the terminal 1, which obtains various kinds of level values shown in Table 1, causes the sort section 14 to sort, for example, the reception level values R2 through R5 or the level difference values D2 through D5 in strength order, and causes the relative distance estimation section 16 to estimate the respective relative distances between the terminal 1 and the terminals 2 through 5. Further, the sorting determines the order in which the second terminals are closer to the terminal 1, thus facilitating the second terminal closer to the first terminal to be given a higher priority for permission of the connection to the first terminal.

Note that, relative distance estimation by the relative distance estimation section 16 may be performed according to the values after sorting or for the values without sorting. However, as a matter of course, without sorting, the effect as described above cannot be obtained.

Here, the following will describe the procedure for checking reception levels or the procedure for checking level difference values in the wireless communications system of the present embodiment. The checking procedure is basically performed in the procedure for initiating connection. Generally, the problem is the probability of unwanted connection to any of the second terminals upon connection. A wireless mobile communications system free of fixed base stations, such as a specific low-power radio system, IrDA, IEEE802.11a, IEEE802.11b, and Bluetooth® is a system assuming movement at a walking speed at the fastest, so that after the connection, an unintended disconnection never happens due to a high-speed movement.

Figure 6:
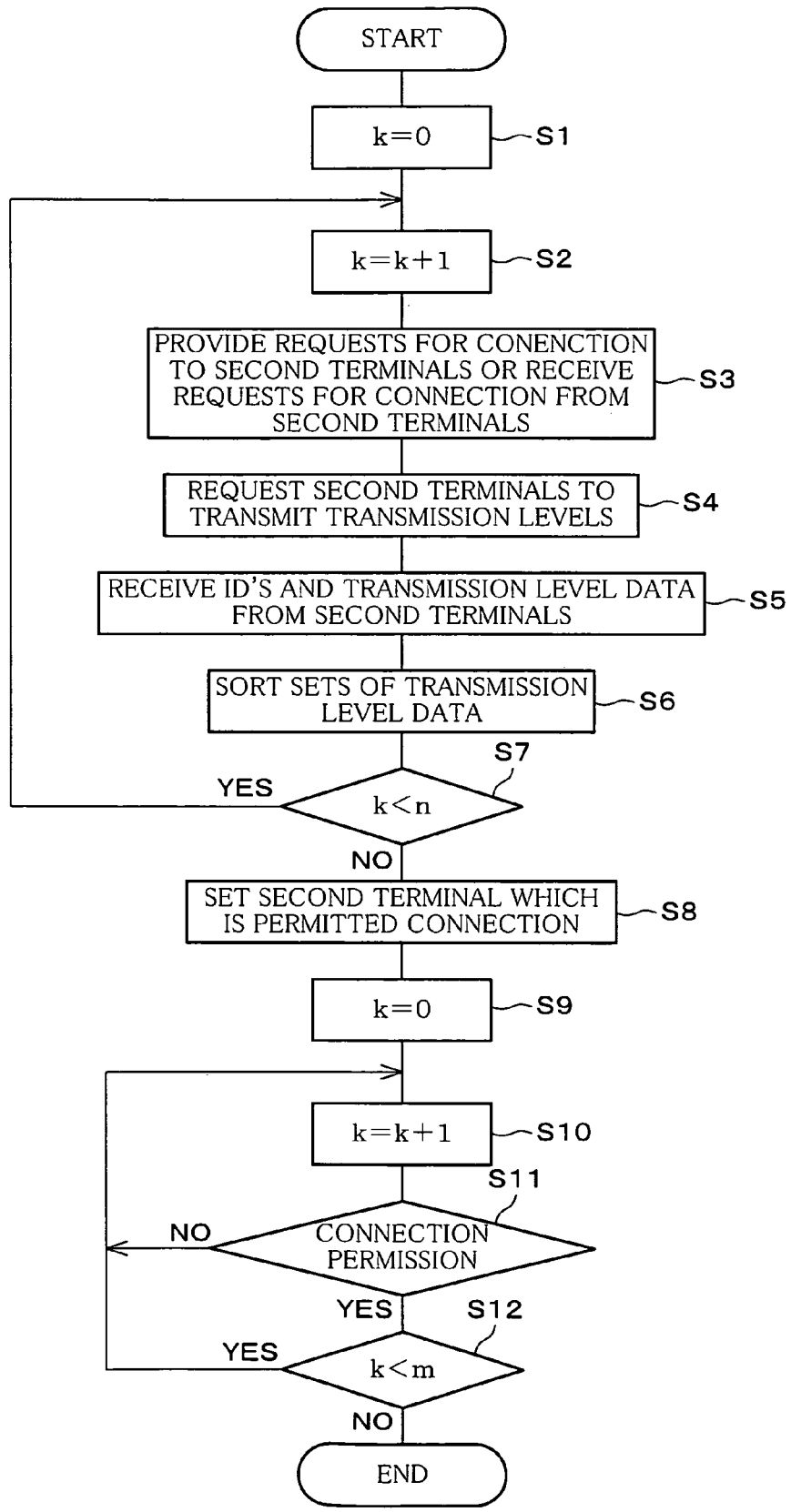
FIG. 6 is a flowchart showing a procedure for checking a transmission level in the estimation process in FIG. 4.

Referring to the flowchart in FIG. 6, the following will describe the procedure for checking transmission levels in the foregoing first process (FIG. 4).

For implementation of this checking procedure, the following two procedures are prepared: checking of connection-requesting terminals and selection of connection-permitted terminals. In the procedure for checking connection-requesting terminals, the number of terminals attempting access to the first terminal or of terminals requesting the access to the first terminal (hereinafter referred to as "access terminals") is obvious by resetting. Let this number denote as n.

To begin with, in the first terminal (terminal 1), the control section 11 resets a counter value k to 0 to count the number of access terminals (S1), and increments the counter by one (S2). Upon occurrence of a request for connection to the second terminal (terminal 2, 3, 4, or 5) or a request for connection from the second terminal (S3), the first terminal transmits a request signal to the second terminals to be connected, so as to request the second terminals to transmit transmission level data to the first terminal (S4). When the first terminal receives ID information and transmission level data transmitted from the second terminals in response to the request (S5), the first terminal causes to the sort section 14 to sort transmission level data transmitted from the second terminals (S6). The first terminal performs these steps until the counter increases to n (S7). The above procedure enables the recognition of IDs and transmission levels for all access-requesting terminals.

Note that, in the above procedure, the step S2 is performed before the steps S3 through S6. However, the step S2 may be performed after the steps S3 through S6.

In the step S7, when the counter increases to n, the first terminal performs the procedure for setting the second terminal to be permitted the connection (S8). In this procedure, the control section 11 resets a counter value k to 0 to count the number of connection-permitted terminals m (S9). The control section 11 increments the counter by one (S10), and analyzes ID data acquired from the second terminal so as to judge whether the second terminal is identical with the terminal to be permitted the connection (S11). The control section 11 performs the step S11 for all of the terminals attempting the access to the first terminal (S12), and determines all the terminals to be permitted the connection to the first terminal. After the step S12, the procedure for connecting with the terminal granted connection permission is carried out.

Note that, in the foregoing procedure, the step S10 is performed before the step S11. However, the step S10 may be performed after the step S11. Further, in the foregoing procedure, after grant of the connection permission to the m number of second terminals, connection process is carried out with the second terminals. However, it may be arranged such that the connection process is carried out for one second terminal having been permitted the connection, and thereafter shifting to the connection permission setting procedure for another second terminal.

Figure 7:
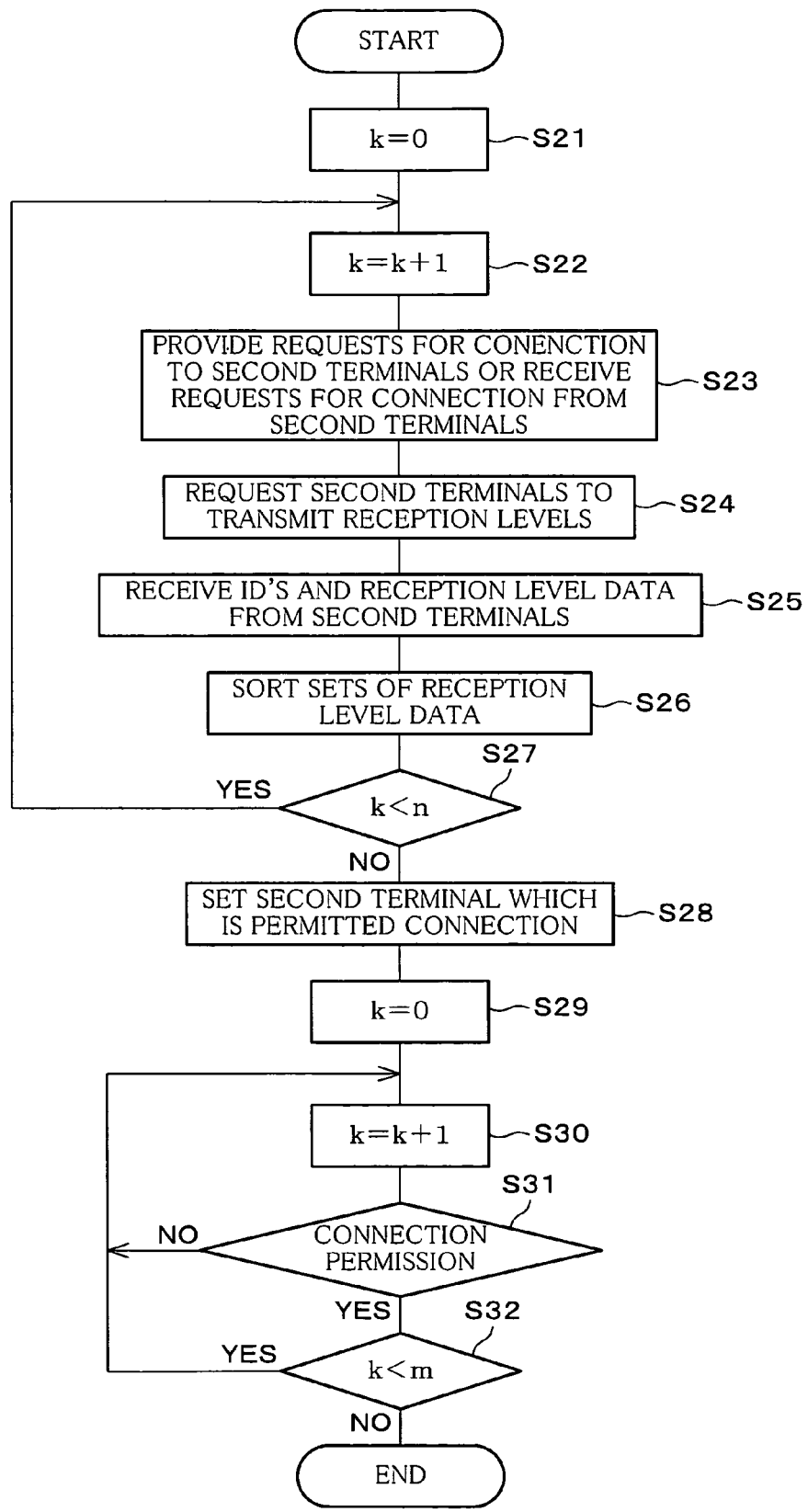
FIG. 7 is a flowchart showing a procedure for checking a reception level in the estimation process in FIG. 5.

Next, referring to the flowchart in FIG. 7, the following will describe the procedure for checking a reception level in the foregoing second process (in FIG. 5).

For implementation of this checking procedure, the following two procedures are prepared: checking of connection-requesting terminals and selection of connection-permitted terminals. In the procedure for checking connection-requesting terminals, the number of terminals attempting access to the first terminal or of terminals requesting the access to the first terminal (hereinafter referred to as "access terminals") is obvious by resetting. Let this number denote as n.

To begin with, in the first terminal (terminal 1), the control section 11 resets a counter value k to 0 to count the number of access terminals (S21), and increments the counter by one (S22). Upon occurrence of a request for connection to the second terminal (terminal 2, 3, 4, or 5) or a request for connection from the second terminal (S23), the first terminal transmits a request signal to the second terminals to be connected, so as to request the second terminals to transmit reception level data to the first terminal (S24). When the first terminal receives ID information and reception level data transmitted from the second terminals in response to the request (S25), the first terminal causes to the sort section 14 to sort reception level data transmitted from the second terminals (S26). The first terminal performs these steps until the counter increases to n (S27). The above procedure enables the recognition of IDs and reception levels for all access-requesting terminals.

Note that, in the above procedure, the step S22 is performed before the steps S23 through S26. However, the step S22 may be performed after the steps S23 through S26.

In the step S27, when the counter increases to n, the first terminal performs the procedure for setting the second terminal to be permitted the connection (S28). In this procedure, the control section 11 resets a counter value k to 0 to count the number of connection-permitted terminals m (S29). The control section 11 increments the counter by one (S30), and analyzes ID data acquired from the second terminal so as to judge whether the second terminal is identical with the terminal to be permitted the connection (S31). The control section 11 performs the step S31 for all of the terminals attempting the access to the first terminal (S32), and determines all the terminals to be permitted the connection to the first terminal. After the step S32, the procedure for connecting with the terminal granted connection permission is carried out.

Note that, in the foregoing procedure, the step S30 is performed before the step S31. However, the step S30 may be performed after the step S31. Further, in the foregoing procedure, after grant of the connection permission to the m number of second terminals, connection process is carried out with the second terminals. However, it may be arranged such that the connection process is carried out for one second terminal having been permitted the connection, and thereafter shifting to the connection permission setting procedure for another second terminal.

Figure 8:
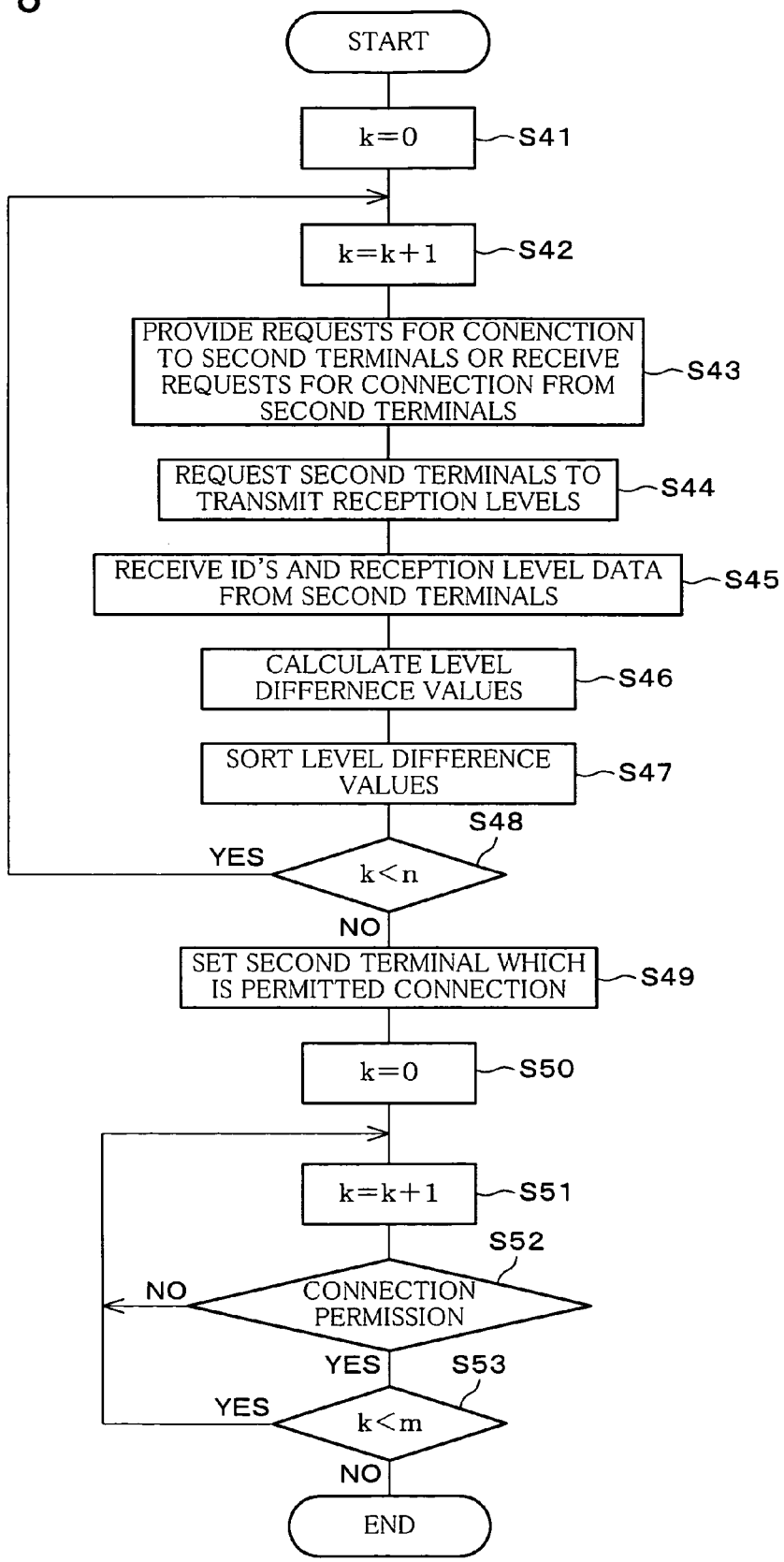
FIG. 8 is a flowchart showing a procedure for checking a level difference value in the estimation process in FIG. 4 or FIG. 5.

Next, referring to the flowchart in FIG. 8, the following will describe the procedure for checking a level difference value in the foregoing first process (in FIG. 4) or the foregoing second process (in FIG. 5).

For implementation of this checking procedure, the following two procedures are prepared: checking of connection-requesting terminals and selection of connection-permitted terminals. In the procedure for checking connection-requesting terminals, the number of terminals attempting access to the first terminal or of terminals requesting the access to the first terminal (hereinafter referred to as "access terminals") is obvious by resetting. Let this number denote as n.

To begin with, in the first terminal (terminal 1), the control section 11 resets a counter value k to 0 to count the number of access terminals (S41), and increments the counter by one (S42). Upon occurrence of a request for access to the second terminal (terminal 2, 3, 4, or 5) or a request for connection from the second terminal (S43), the first terminal transmits a request signal to the second terminals to be connected, so as to request the second terminals to transmit reception level data to the first terminal (S44). When the first terminal receives ID information and reception level data transmitted from the second terminals in response to the request (S45), the processing section 11 calculates the level difference values in accordance with the transmission level of the first terminal and the reception levels of the second terminals (S46), and sorts the calculated level difference values (S47).

The first terminal performs these steps until the counter increases to n (S48). The above procedure enables the recognition of level difference values for all access-requesting terminals.

Note that, in the above procedure, the step S42 is performed before the steps S43 through S47. However, the step S42 may be performed after the steps S43 through S47.

In the step S48, when the counter increases to n, the first terminal performs the procedure for setting the second terminal to be permitted the connections (S49). In this procedure, the control section 11 resets a counter value k to 0 to count the number of connection-permitted terminals m (S50). The control section 11 increments the counter by one (S51), and analyzes ID data acquired from the second terminal so as to judge whether the second terminal is identical with the terminal to be permitted the connection (S52). The control section 11 performs the step S52 for all of the terminals attempting the access to the first terminal (S53), and determines all the terminals to be permitted the connection to the first terminal. After the step S53, the procedure for connecting with the terminal granted connection permission is carried out.

Note that, in the foregoing procedure, the step S51 is performed before the step S52. However, the step S51 may be performed after the step S52. Further, in the foregoing procedure, after grant of the connection permission to the m number of second terminals, connection process is carried out with the second terminals. However, it may be arranged such that the connection process is carried out for one second terminal having been permitted the connection, and thereafter shifting to the connection permission setting procedure for another second terminal.

The above description has been given based on the procedure for checking the foregoing level difference values in the second process. Alternatively, the first process using a transmission level of the second terminal transmitted from the second terminal may be adopted for the foregoing checking procedure.

Since the first terminal recognizes that the second terminal having the smallest level difference value is at the nearest position relative to the first terminal as a result of sorting of the level difference values, it is possible to permit the communications only with that second terminal. In such a case, since the second terminals are usually at a short distance from the first terminal, accesses from the second terminals to which the first terminal does not intend to connect can be blocked for the prevention of unauthorized access. Further, by estimating relative distances from reception level values and permitting communications only with the terminals having values closer to a given threshold, access to the first terminal can be limited to a particular group existing in the neighborhood of the first terminal.

Here, the following will describe the method for realizing the connection permission.

As a method of granting connection permission to only one particular terminal, the following two methods are given.

The first method is a method of selecting a terminal having the largest reception level value or a terminal having the smallest level difference value. In this method, since, upon receipt of reception level values from a plurality of second terminals by the first terminal, the control section 11 as closest terminal determination means and selection means, by processing of the sort section 14 and the relative distance estimation section 16, can estimate a second terminal providing the largest reception level value at the closest position to the first terminal, the control section 11 grants the connection permission to the second terminal in accordance with its ID. Further, the control section 11, by processing of the sort section 14 and the relative distance estimation section 16, estimates a second terminal providing the smallest level difference value at the closest position to the first terminal, the control section 11 grants the connection permission to the second terminal in accordance with its ID. A small level difference value, that is, a transmission level value and a reception level value close to each other means the smallest transmission level decrease. In this case, it is estimated that a relative distance is short.

The second method is a method of connecting with a second terminal having transmitted a reception level value first. In this method, since the control section 11 can recognize the types of second terminals existing at the neighbor of the first terminal according to IDs, it is not necessary to select a particular terminal when connections with any terminals are allowed. Therefore, by adopting this method, it is possible to minimize a connection time.

Further, as another method of granting the connection permission to only one particular terminal, a method of selecting a terminal having the largest transmission level value is given. In this method, upon receipt of reception level values from a plurality of second terminals by the first terminal, the control section 11 as closest terminal determination means and selection means, by processing of the sort section 14, determines a second terminal providing the largest transmission level value and grants the connection permission to the second terminal in accordance with its ID.

A larger transmission level enables communications in a larger area. Therefore, the first terminal can communicate with a third terminal outside an ordinary communications area of the first terminal via a terminal (relay terminal) having a large transmission level, which is granted connection permission (which is selected) as described above. Using such a relay terminal having a large transmission level, it is possible to easily expand a communications area of the first terminal.

On communications with the third terminal, the first terminal instructs the relay terminal to connect between the relay terminal and the third terminal. Then, the transmission data from the first terminal is received by the relay terminal in the state where the first terminal and the third terminal are connected to each other, the relay terminal transmits the transmission data to the third terminal. Further, data transmission from the third terminal to the first terminal is carried out in the same manner.

The following three methods are given as a method of granting the connection permission to one or more second terminal.

The first method is a method of specifying a threshold value for a reception level value and granting the connection permission to the second terminal having a reception level value larger than the threshold value, or a method of specifying a threshold value for a level difference value and granting the connection permission to the second terminal providing a difference value less than the threshold value. In the former method, the control section 11, as close terminal determination means and selection means, permits the second terminal having a reception level value more than a threshold value calculated by the reception level measurement section 13 to communicate with the first terminal in accordance with the ID of the second terminal. In this manner, a second terminal having a larger reception level value is given a higher priority to be granted the connection permission, whereby the first terminal can make connections with a plurality of terminals closest to the first terminal. In the latter method, the control section 11 determines the second terminal having a level difference value, which has been obtained by the processing of the sort section 14 and the relative distance estimation section 16, less than the threshold value as being close to the first terminal, and grants the connection permission to the second terminal in accordance with its ID. In this manner, a second terminal having a smaller level difference value is given a higher priority to be granted the connection permission, whereby the first terminal can make connections with a plurality of terminals closest to the first terminal.

The second method is a method of granting the permission in the order in which the second terminals make a response early. In this method, the control section 11 can recognize the type of second terminal close to the first terminal with the ID or the like of the second terminal, so that it is not necessary to select a particular terminal when connections with any terminals are allowed. Therefore, adoption of this method makes it possible to minimize a connection time.

This method is suitable for the case where selected second terminals have a uniform performance, and for example, this method is available for a system consisting of a plurality of client terminals and one server controlling the client terminals. Examples of this system include a wireless conference system using personal computers provided in a conference room, an education system provided in a computer room of a school, and the like. In such a system delivered at a time, terminals functioning as clients are all the same products in most cases, and such terminals have no difference in performance and have about the same response property. Therefore, when the above method is applied to such a system, the server can immediately recognize the client terminals and make connections with the client terminals in accordance with information transmitted from the client terminals which are turned on by their users at the beginning of a conference and a class.

The third method is a method of granting the permission to all of the terminals capable of connection without any limitations. In this method, when the first terminal unilaterally provides information, the control section 11 grants the connection permission to all of the second terminals making a request for connection. This makes it possible to realize provision of information from the first terminal to the second terminal all at once.

As another method of granting the connection permission to at least particular terminals, a method of selecting a terminal having a transmission level value greater than the predetermined threshold value. In this method, when the first terminal receives a transmission level value from at least one second terminals (especially, from a plurality of second terminals), the control section 11, as terminal determination means and selection means, determines the second terminal providing the transmission level value greater than the threshold value and grants the connection permission to the second terminal in accordance with its ID.

Note that, in the case of the foregoing first and second methods, the control section 11 instructs whether the connection permission is granted to all second terminals close to the first terminal, or whether the connection permission is granted to a particular number of second terminals.

In the case of a short relative distance, when the control section 11 as transmission level reduction means recognizes that a reception level have become greater than the predetermined value, the control section 11 instructs the modulation/demodulation section 12 to reduce the transmission level. This makes it possible to reduce a power consumption of the first terminal, to decrease adverse effects caused by noise and crosstalk into the second terminal not intended to communicate, and to lower the risk that communications are intercepted by the second terminal not intended to connect.

On the other hand, in the case of a long relative distance, when the control section 11 as transmission level raise means recognizes that the reception level has become less than the predetermined value, the control section 11 instructs the modulation/demodulation section 12 to raise the transmission level. This makes it possible to prevent unexpected disconnections so as to continue the connection. Further, in the case where the other end terminal moves closer to the first terminal, the transmission level is gradually decreased to prevent an increased power consumption resulting from a too large transmission level with respect to a distance between the terminals. When the other end terminal moves away from the first terminal, the transmission level is raised to prevent the disconnection. This operation makes it possible to maintain the connection with a particular other end terminal while reducing the power consumption. Such a transmission level is controlled by the control section 11.

Figure 9:
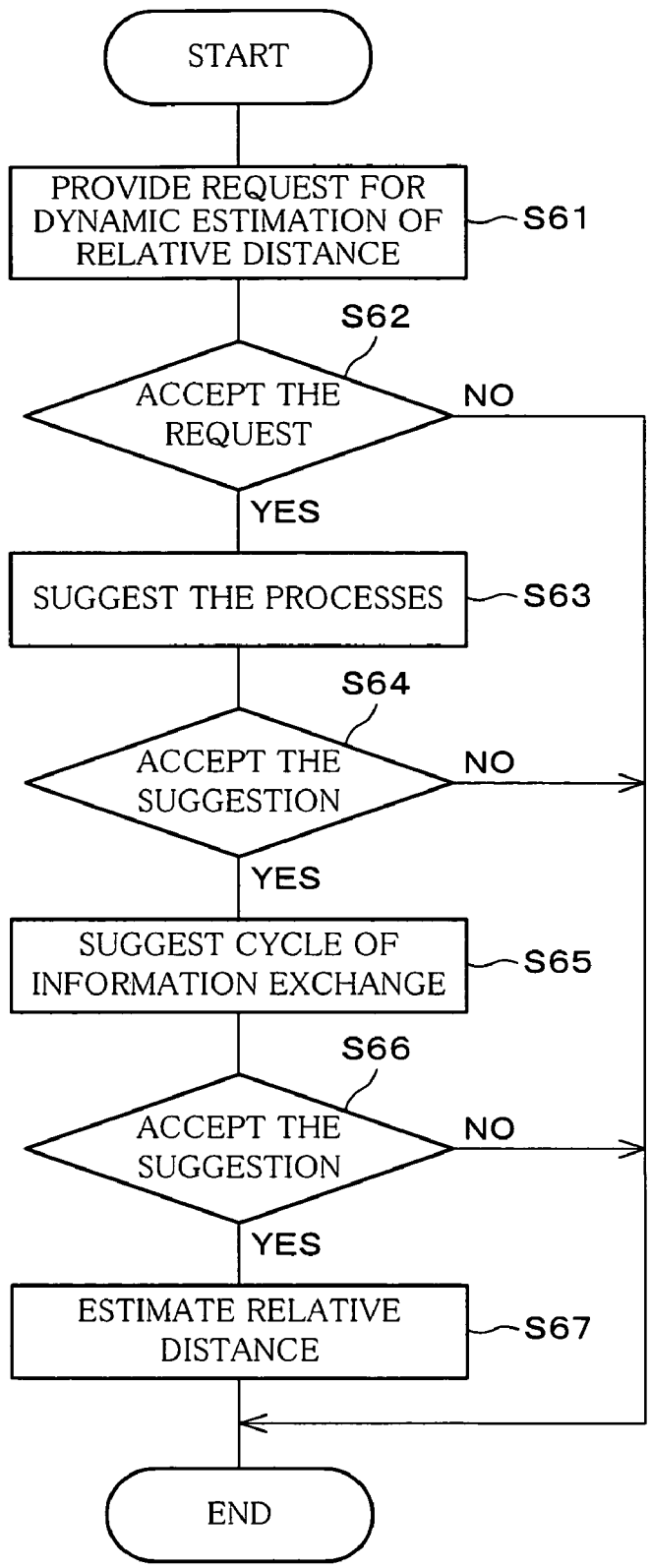
FIG. 9 is a flowchart showing a procedure for dynamically estimating a relative distance between terminals in the wireless communications system.

Further, in the wireless communications system of the present embodiment, it is possible to check the movement of the first terminal or the second terminal by periodically transmitting and receiving transmission and reception level information each other. More specifically, the terminal movement checking is realized by the following procedure. FIG. 9 is a flowchart showing the procedure for dynamically estimating a relative distance between the terminals.

To begin with, a request for dynamic estimation of a relative distance between terminals from any one of the terminals (for example, the first terminal) (S61), the other end terminal having received the request sends back a response indicating acceptance or refusal of the request (S62). If obtaining the acceptance from the other end terminal, the terminal having transmitted the request suggests to perform whether the foregoing first process (FIG. 4) or the foregoing second process (FIG. 5) (S63).

The other end terminal having received the suggestion sends back a response indicating acceptance or refusal of the suggestion (S64).

When acceptance is obtained from the other end terminal, the terminal having transmitted the request further suggests a cycle of information exchange, for example, 10 seconds, 1 second, or the like (S65). The other end terminal having received this suggestion sends back acceptance or refusal to the suggestion (S66). When the both terminals comes to an agreement at the end, the process for dynamically estimating a relative distance between terminals by the process selected by the other end terminal (S67). Further, when the request in S62 and the suggestions in S64 and S66 are refused, the process is ended.

In the above procedure, for example, in the exchange between the terminal 1 and the terminal 2, in the case where one of the terminal 1 and the terminal 2 becomes a terminal making a request, the control section 11 or 27 makes a request or suggestion, and the other terminal performs a process for sending back a response to the request. At this moment, for writing control, the control sections 11 and 27 as transmission level writing means and reception level writing means instruct the data processing section 17 and the transmitting system processing section 25 to write a transmission signal into a transmission level or a reception level in a cycle (at the above cycle).

Further, in the wireless communication system of the present embodiment, preparation of a plurality of fixed terminals having positional information database makes it possible to determine an absolute position of the mobile terminal. This technique has been already carried out for a position determination system of PHS® and is applicable to the wireless communications system of the present embodiment.

Figure 10:
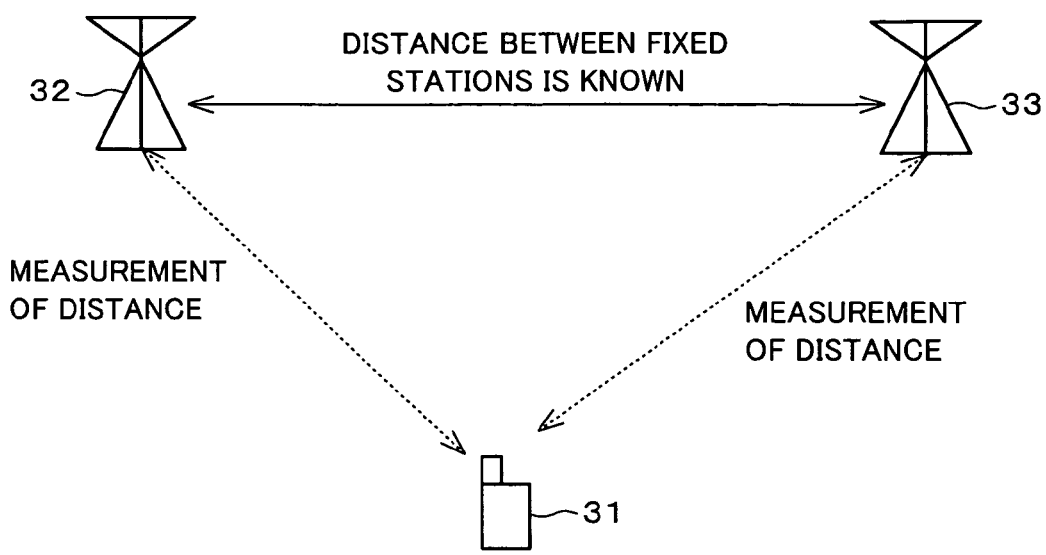
FIG. 10 is a view schematically showing another process of estimating a relative distance between first terminal and second terminal in the wireless communications system.

FIG. 10 shows a system including the foregoing fixed terminals. As shown in FIG. 10, a relative distance between the mobile terminal 31 (for example, terminal 1) and the fixed stations 32 and 33 (in the case of PHS®, base stations, not fixed antennas established in a town) can be determined. According to this, when there are two or more fixed stations, length of three sides can be obtained, thus enabling to determine the position of the terminal by triangulation. Note that, in this case, the fixed stations 32 and 33 are necessary to have positional information of the fixed stations 32 and 33 as positional information database, including their own positional information.

Note that, the wireless communications system of the present embodiment may particularly have means for processing audio information.

Figure 11:
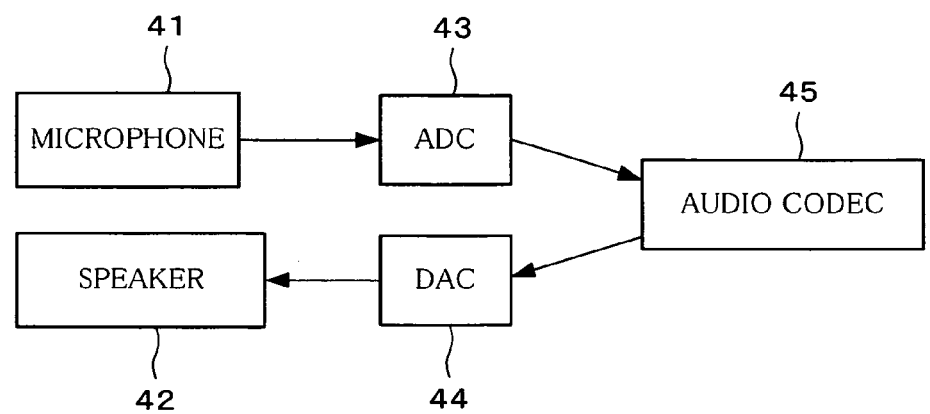
FIG. 11($a$) and FIG. 11($b$) are block diagrams showing a configuration of an audio processing apparatus provided in each terminal in the wireless communications system.
Figure 11:
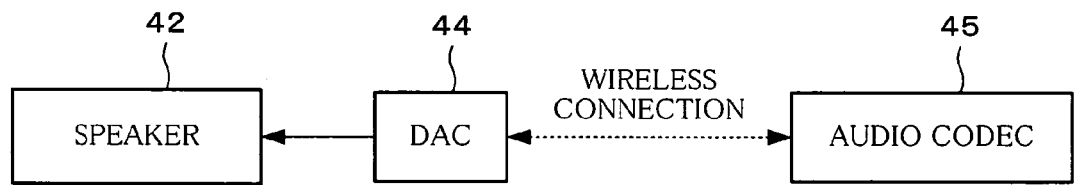
Figure 12:
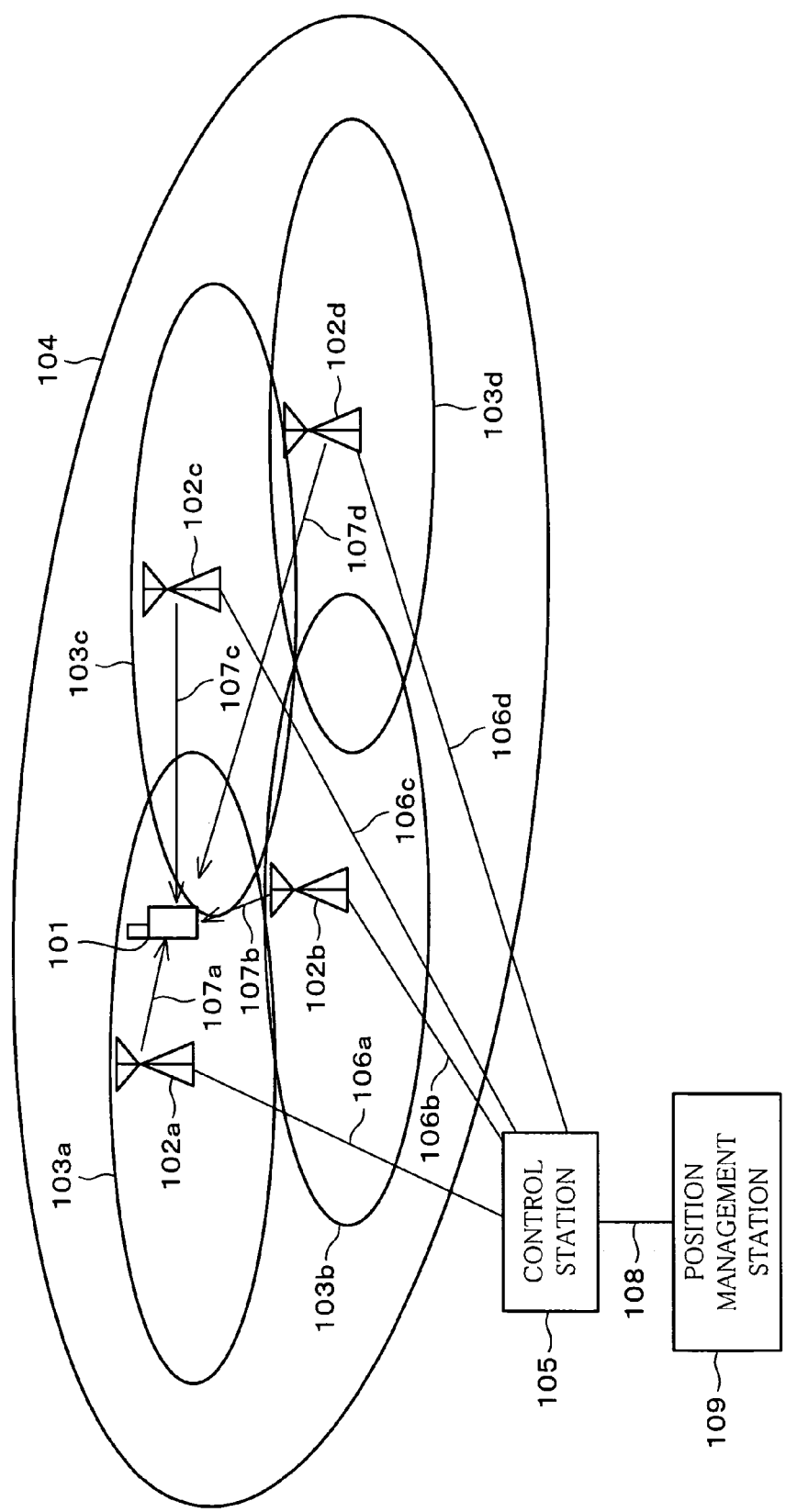
FIG. 12 is a view showing a positional information detection system for wireless mobile communications having conventional fixed base stations.

FIG. 11(*a*) and FIG. 11(*b*) show examples of arrangement of an audio processing apparatus provided in each terminal.

The audio processing apparatus shown in FIG. 11(*a*) includes a microphone 41, a speaker 42, an AD converter (ADC in FIG. 11(*a*)) 43, a DA converter (DAC in FIG. 11(*b*)) 44, and an audio codec 45.

In such an arrangement, an audio signal outputted from the microphone 41 is converted in digital form by the AD converter 43, and further compressed and encoded by the audio codec 45. According to instructions provided by the control section 11 in FIG. 1, the compressed audio data is incorporated into transmission data by the data processing section 17, and is transmitted via the modulation/demodulation section 12. Meanwhile, after audio data included in reception data is retrieved from the reception data after demodulated by the modulation/demodulation section 12 according to instructions provided by the control section 11, the audio data is supplied and decoded to original data in the audio codec 45. Then, the decoded audio data from the audio codec 45 is converted into analog form by the DA converter 44. Thereafter, the converted data is outputted as audio from the speaker 42.

Inclusion of such an audio processing apparatus makes it possible to provide a terminal with a function as a short distance calling apparatus such as a transceiver.

Further, another audio processing apparatus, as shown in FIG. 11(*b*), is arranged so as to perform wireless connection between the audio codec 45 and the DA converter 44, omitting the microphone 41 and the AD converter 43 from the arrangement of FIG. 11(*a*). In such an arrangement, the audio codec 45 is incorporated into each terminal, and the speaker 42 and the DA converter 44 are provided separately from the terminal.

With this arrangement, it is possible to provide a terminal with a function of a wireless player which reproduces audio data received from the second terminal. Therefore, the foregoing audio processing apparatus can be applied to a headphone-type portable music player, for example. In this arrangement, a combination of a speaker side and an audio codec side, that is, parties to be connected are always the same, so that it is possible to uniquely decide an identification code.

Note that, the above description is based on an arrangement in which the audio codec 45 is mounted on the terminal main body. However, the present embodiment may adopt an arrangement such that the audio codec 45 is mounted on the speaker terminal having the speaker 42 and the DA converter 44, and wireless connections are made between the data processing section 17 and the audio codec 45.

The present embodiment relates to a small system performing mobile communications over the radio (radio waves or light), not a large wireless communications system, and is particularly preferable to small-scale communications in the case where terminal apparatuses themselves communicating with each other are movable. In such communications, it is preferable that the terminal apparatuses communicate with each other, adjusting transmission levels (power, electrical strength, output) depending on a distance between them.

In such a system, a distance to the second terminal is determined by judging that a transmission level of the first terminal is observed as what reception level by the second terminal, or that a transmission level of the second terminal is observed as what reception level by the first terminal. Then, as a result of determination, more appropriate transmission level adjustment is performed.

Further, estimation of a distance between the terminals in the foregoing wireless communications system is applicable to communications between a fixed base station and a mobile terminal. Further, the present embodiment may be arranged such that the antenna 12*a* of the terminal 1 and the antenna 21 of the terminal 2 have directivities, and a reception sensitivity is changed depending on a distance to the other end terminal. With this arrangement, it is possible to estimate a longer distance between the mobile terminals in short distance communications not including fixed base stations.

As described above, a wireless communications apparatus may include: reception level acquisition means for acquiring respective reception levels of wireless signals transmitted from at least one mobile terminals; and relative distance estimation means for estimating a relative distance to the mobile terminal in accordance with the reception level.

According to the foregoing arrangement, when the reception level acquisition means acquire the reception levels of the wireless signals transmitted from the mobile terminals, the relative distance estimation means estimate a relative distance to the mobile terminal in accordance with the reception level. Generally, there is the later-described specific relationship between a reception electrical strength in the wireless communications and a distance from a transmitter to a receptor, so that the relative distance estimation means estimate the relative distance in accordance with a reception level acquired by using the relationship.

More specifically, in the case where relative distances to a plurality of mobile terminals are estimated, a difference in transmission level between the mobile terminals caused by the difference in type of the mobile terminals causes a reception level corresponding to a transmission level. Therefore, the relative distance becomes a value corresponding to a relative difference between the reception level of the wireless communication apparatus and the transmission level of the mobile terminal. However, in the case where relative distances to a plurality of mobile terminals are estimated, the mobile terminals of the same type have all the same transmission levels. Therefore, the relative distance becomes a value corresponding to the reception level, so that it is possible to estimate the relative distance only with the reception level.

It is preferable that the foregoing wireless communications apparatus further include: transmission level acquisition means for acquiring respective transmission levels of the mobile terminals; and difference value calculation means for calculating respective difference values between the transmission levels and the reception levels, wherein: the relative distance estimation means estimate a relative distance with respect to the mobile terminal in accordance with the difference value, instead of the reception level.

In such an arrangement, the reception level acquisition means measure and acquire the reception level of the wireless signal, for example, and the transmission level acquisition means retrieve and acquire the transmission level of the mobile terminal contained in the wireless signal, for example. When the difference value between the acquired transmission level and the reception level is calculated by the difference value calculation means, the relative distance to the mobile terminal is estimated in accordance with the calculated difference value by the relative distance estimation means.

As described previously, in the case of a plurality of mobile terminals of different types, the relative distance becomes a value corresponding to a relative difference between the reception level of the wireless communication apparatus and the transmission level of the mobile terminal. Therefore, even in the case of the mobile terminals of different types, the estimation of the relative distance is possible.

It is preferable that the foregoing wireless communications apparatus further includes: transmission level writing means for writing a transmission level pf the wireless communications apparatus into a wireless signal to be transmitted to the mobile terminal. With this arrangement, in the case where the wireless communications apparatus functions as a mobile terminal, the wireless communications apparatus can transmit a transmission level to the other-end wireless communications apparatus. Since the other-end wireless communications apparatus can acquire the reception level of the wireless communications apparatus by the reception level acquisition means, by acquiring the transmission level written in the above manner from the received wireless signal, it is possible to calculate a difference value using these transmission level and reception level.

Further, the transmission level writing means write the identification code for the wireless communications apparatus into the wireless signal, so that the other-end wireless communications apparatus can easily identify the mobile terminals in the case where there are a plurality of mobile terminals of different types.

It is preferable that the foregoing wireless communications apparatus further includes: reception level writing means for writing the reception level into a wireless signal to be transmitted to the mobile terminal. With this arrangement, in the case where the wireless communications apparatus functions as a mobile terminal, the wireless communications apparatus can transmit the reception level in response to a request from the other-end wireless mobile communications apparatus. Since the other-end wireless communications apparatus can acquire the transmission level of the wireless communications apparatus by the transmission level acquisition means, by acquiring the reception level written in the above manner from the received wireless signal, it is possible to calculate a difference value using these transmission level and reception level.

Further, the reception level writing means write the identification code for the wireless communications apparatus into the wireless signal, so that the other-end wireless communications apparatus can easily identify the mobile terminals in the case where there are a plurality of mobile terminals of different types.

It is preferable that the foregoing wireless communications apparatus further includes: reception level sorting means for sorting the reception levels acquired by the reception level acquisition means. With this arrangement, by sorting the reception levels in decreasing order, it is possible to easily determine which of the mobile terminals is the closest mobile terminal. Alternatively, it is preferable that the foregoing wireless communications apparatus further includes: difference value sorting means for sorting difference values calculated by the difference value calculation means. With this arrangement, by sorting the reception levels in decreasing order, it is possible to easily determine which of the mobile terminals is the closest mobile terminal.

It is preferable that the foregoing wireless communications apparatus further includes: identification code acquisition means for acquiring respective identification codes for a plurality of the mobile terminals, the identification codes being contained in the wireless signals transmitted from the mobile terminals; closest terminal determination means for determining, as a closest mobile terminal, a mobile terminal providing a largest reception level among the reception levels acquired by the reception level acquisition means; selection means for selecting, in accordance with the acquired identification code of the closest mobile terminal thus determined, only the mobile terminal having the identification code to be connected.

In such an arrangement, in accordance with reception levels, having been acquired by the reception level acquisition means, upon receipt of the wireless signals transmitted from a plurality of mobile terminals of the same type, the closest terminal determination means determines the mobile terminal providing the largest reception level as a closest mobile terminal. Then, the selection means select only the mobile terminal having the identification code acquired by the identification code acquisition means among the mobile terminals. With this arrangement, it is possible to easily select only the closest mobile terminal among the mobile terminals of the same type.

It is preferable that the foregoing wireless communications apparatus further includes: identification code acquisition means for acquiring respective identification codes for a plurality of the mobile terminals, the identification codes being contained in the wireless signals transmitted from the mobile terminals; terminal determination means for determining a mobile terminal providing a largest transmission level among the transmission levels acquired by the transmission level acquisition means; and selection means for selecting, in accordance with the acquired identification code of the mobile terminal thus determined, only the mobile terminal having the identification code to be connected.

In such an arrangement, in accordance with transmission levels, having been acquired by the transmission level acquisition means, included in the wireless signals transmitted from a plurality of mobile terminals of the same type, the terminal determination means determine the mobile terminal providing the largest reception level. Then, the selection means select only the mobile terminal having the identification code acquired by the identification code acquisition means among the mobile terminals. With this arrangement, it is possible to easily select only the mobile terminal providing the largest transmission level among the mobile terminals of the same type. Therefore, the wireless communications apparatus can communicate with the second terminal via the mobile terminal providing the largest transmission level. Accordingly, it is possible to expand a communication area of the wireless communications apparatus.

It is preferable that the foregoing wireless communications apparatus further includes: identification code acquisition means for acquiring respective identification codes for a plurality of the mobile terminals, the identification codes being contained in the wireless signals transmitted from the mobile terminals; closest terminal determination means for determining, as a closest mobile terminal, a mobile terminal providing a smallest difference value among the difference values calculated by the difference value calculation means; and selection means for selecting, in accordance with the acquired identification code of the closest mobile terminal thus determined, only the mobile terminal having the identification code to be connected.

In such an arrangement, in accordance with the difference values calculated with respect to a plurality of mobile terminals by the difference value calculation means, the closest terminal determination means determine a mobile terminal providing a smallest difference value, as the closest mobile terminal. Then, the selection means select only the mobile terminal having the identification code acquired by the identification code acquisition means among the mobile terminals. In this case, with this arrangement, it is possible to easily select only the closest mobile terminal among the mobile terminals of the same type or of different types.

It is preferable that the foregoing wireless communications apparatus further includes: identification code acquisition means for acquiring respective identification codes for a plurality of the mobile terminals, the identification codes being contained in the wireless signals transmitted from the mobile terminals; close terminal determination means for determining, as close mobile terminals, at least one mobile terminals providing a reception level greater than a predetermined threshold value among the reception levels acquired by the reception level acquisition means; and selection means for selecting, in accordance with the identification codes acquired for the close mobile terminals thus determined, mobile terminals having the identification code to be connected.

In such an arrangement, in accordance with reception levels, having been acquired by the reception level acquisition means, upon receipt of the wireless signals transmitted from a plurality of mobile terminals of the same type, the close terminal determination means determine the mobile terminal having a reception level greater than a threshold value, as a close mobile terminal. Then, the selection means select the mobile terminal having the identification code acquired by the identification code acquisition means among the mobile terminals. With this arrangement, it is possible to easily select close mobile terminals which are within a predetermined distance from the wireless communications apparatus, among the mobile terminals of the same type.

It is preferable that the foregoing wireless communications apparatus further includes:

identification code acquisition means for acquiring respective identification codes for a plurality of the mobile terminals, the identification codes being contained in the wireless signals transmitted from the mobile terminals; terminal determination means for determining at least one mobile terminals providing a transmission level greater than a predetermined threshold value among the transmission levels acquired by the transmission level acquisition means; and selection means for selecting, in accordance with the identification codes acquired for the mobile terminals thus determined, mobile terminals having the identification code to be connected.

In such an arrangement, in accordance with transmission levels, having been acquired by the transmission level acquisition means, included in the wireless signals transmitted from a plurality of mobile terminals of the same type, the terminal determination means determine the mobile terminal providing a transmission level greater than a threshold value. Then, the selection means select the mobile terminal having the identification code acquired by the identification code acquisition means among the mobile terminals. With this arrangement, it is possible to easily select only the mobile terminal providing the largest transmission level among the mobile terminals of the same type. Therefore, the wireless communications apparatus can communicate with the second terminal via the mobile terminal providing the largest transmission level. Accordingly, it is possible to expand a communication area of the wireless communications apparatus.

It is preferable that the foregoing wireless communications apparatus further includes: identification code acquisition means for acquiring respective identification codes for a plurality of the mobile terminals, the identification codes being contained in the wireless signals transmitted from the mobile terminals; close terminal determination means for determining, as close mobile terminals, at least one mobile terminals providing a difference value less than a predetermined threshold value among the difference values calculated by the difference value calculation means; and selection means for selecting, in accordance with the identification codes acquired for the close mobile terminals thus determined, mobile terminals having the identification code to be connected.

In such an arrangement, in accordance with the difference values calculated with respect to a plurality of mobile terminals by the difference value calculation means, the close terminal determination means determine mobile terminals providing a difference value less than a predetermined threshold value, as close mobile terminals. Then, the selection means select the mobile terminal having the identification code acquired by the identification code acquisition means among the mobile terminals. In this case, with this arrangement, it is possible to easily select close mobile terminals which are within a predetermined distance from the wireless communications apparatus, among the mobile terminals of the same type or of different types.

It is preferable that the foregoing wireless communications apparatus further includes: transmission level reduction means for reducing a transmission level of a wireless signal to be transmitted to a mobile terminal at a relative distance, having been estimated by the relative distance estimation means, shorter than a predetermined distance among the mobile terminals selected by the selection means. With this arrangement, in the case where a relative distance between the wireless communications apparatus and the mobile terminal becomes shorter because they move closer to each other, the transmission level reduction means reduce the transmission level of the wireless signal transmitted to the mobile terminal. Therefore, it is possible to reduce power consumption of the wireless communications apparatus. Further, it is possible to decrease adverse effects caused by noise and crosstalk into the mobile terminal not intended to communicate, and to lower the risk that communications are intercepted by other terminal not intended to communicate.

Alternatively, it is preferable that the wireless communications apparatus further includes: transmission level raise means for raising a transmission level of a wireless signal to be transmitted to a mobile terminal at a relative distance, having been estimated by the relative distance estimation means, longer than a predetermined distance among the mobile terminals selected by the selection means. With this arrangement, in the case where a relative distance between the wireless communications apparatus and the mobile terminal becomes longer because they move away from each other, the transmission level raise means raises the transmission level of the wireless signal transmitted to the mobile terminal. Therefore, it is possible to avoid the unexpected disconnection between the wireless communications apparatus and the mobile terminal. Accordingly, in the situation where either or both of the wireless communications apparatus and the mobile terminal moves, it is possible to maintain the connection between the wireless communications apparatus and the mobile terminal all the time.

It is preferable that the foregoing wireless communications apparatus further includes: writing control means for controlling the transmission level writing means to periodically write a transmission level into a wireless signal. In such an arrangement, under the control of the writing control means, the transmission level writing means periodically write a transmission level into a wireless signal. With this arrangement, a wireless signal including the transmission level is transmitted periodically, and in the wireless communications apparatus having received the wireless signal, the relative distance estimation means estimate the relative distance. Therefore, the wireless communications apparatus can periodically check the movement of the mobile terminal.

Alternatively, it is preferable that the foregoing wireless communications apparatus further includes: writing control means for controlling the reception level writing means to periodically write a reception level into a wireless signal. In such an arrangement, under the control of the writing control means, the reception level writing means periodically write a reception level into a wireless signal. With this arrangement, a wireless signal including the reception level is transmitted periodically, and in the wireless communications apparatus having received the wireless signal, the reception level acquisition means periodically acquire the reception level and the relative distance estimation means estimate the relative distance. Therefore, the wireless communications apparatus can periodically check the movement of the mobile terminal.

A wireless communications system of the present invention includes a plurality of the wireless communications apparatuses. This brings about the effect of easily determining a wireless communications apparatus to be connected among a plurality of wireless communications apparatuses.

The Embodiments and concrete examples of implementation discussed in the foregoing detailed explanation serve solely to illustrate the technical details of the present invention, which should not be narrowly interpreted within the limits of such Embodiments and concrete examples, but rather may be applied in many variations within the spirit of the present invention, provided such variations do not exceed the scope of the patent claims set forth below.

What is claimed is:

1. A wireless communications system comprising:
   (a) at least one mobile terminal; and
   (b) a receiver that is mobile and includes:
   (i) reception level acquisition means for acquiring respective reception levels of wireless signals transmitted from the at least one mobile terminal, wherein the reception level acquisition means measures the respective reception levels of the wireless signals;
   (ii) transmission level acquisition means for acquiring respective transmission levels of the at least one mobile terminal, wherein the transmission level acquisition means retrieves respective transmission levels of the at least one mobile terminal contained in the wireless signals;
   (iii) difference value calculation means for calculating respective difference values between the transmission levels and the reception levels; and
   (iv) relative distance estimation means for estimating a relative distance to the mobile terminal in accordance with the respective difference values
   wherein:
   the reception level acquisition means retrieve respective reception levels of wireless signals sent from the wireless communications apparatus to the at least one mobile terminals contained in the wireless signals of the at least one mobile terminals; and
   the transmission level acquisition means measures a transmission level of the wireless communications apparatus to the at least one mobile terminals.

2. The wireless communications system according to claim 1, further comprising:
   transmission level writing means for writing a transmission level of the wireless communications system into a wireless signal to be transmitted to the mobile terminal.

3. The wireless communications system according to claim 2, wherein:
   the transmission level writing means write an identification code of the wireless communications system into the wireless signal.

4. The wireless communications system according to claim 1, wherein the receiver is further comprising:
   reception level writing means for writing the reception level into a second wireless signal to be transmitted to the mobile terminal.

5. The wireless communications system according to claim 1, wherein:
   the reception level acquisition means writes an identification code of the receiver into the wireless signal.

6. The wireless communications system according to claim 1, further comprising:
   reception level sorting means for sorting the reception levels acquired by the reception level acquisition means.

7. The wireless communications system according to claim 1, further comprising:
   difference value sorting means for sorting difference values calculated by the difference value calculation means.

8. The wireless communications system according to claim 1, further comprising:
   identification code acquisition means for acquiring respective identification codes for a plurality of the mobile terminals, the identification codes being contained in the wireless signals transmitted from the mobile terminals;
   closest terminal determination means for determining, as a closest mobile terminal, a mobile terminal providing a largest reception level among the reception levels acquired by the reception level acquisition means; and
   selection means for selecting, in accordance with the acquired identification code of the closest mobile terminal thus determined, only the mobile terminal having the identification code to be connected.

9. The wireless communications system according to claim 1, further comprising:
   identification code acquisition means for acquiring respective identification codes for a plurality of the mobile terminals, the identification codes being contained in the wireless signals transmitted from the mobile terminals;
   terminal determination means for determining a mobile terminal providing a largest transmission level among the transmission levels acquired by the transmission level acquisition means; and
   selection means for selecting, in accordance with the acquired identification code of the mobile terminal thus determined, only the mobile terminal having the identification code to be connected.

10. The wireless communications system according to claim 1, further comprising:
    identification code acquisition means for acquiring respective identification codes for a plurality of the mobile terminals, the identification codes being contained in the wireless signals transmitted from the mobile terminals;
    closest terminal determination means for determining, as a closest mobile terminal, a mobile terminal providing a smallest difference value among the difference values calculated by the difference value calculation means; and
    selection means for selecting, in accordance with the acquired identification code of the closest mobile terminal thus determined, only the mobile terminal having the identification code to be connected.

11. The wireless communications system according to claim 1, further comprising:
    identification code acquisition means for acquiring respective identification codes for a plurality of the mobile terminals, the identification codes being contained in the wireless signals transmitted from the mobile terminals;
    close terminal determination means for determining, as close mobile terminals, at least one mobile terminals providing a reception level greater than a predetermined threshold value among the reception levels acquired by the reception level acquisition means; and
    selection means for selecting, in accordance with the identification codes acquired for the close mobile terminals thus determined, mobile terminals having the identification code to be connected.

12. The wireless communications system according to claim 1, further comprising:
    identification code acquisition means for acquiring respective identification codes for a plurality of the mobile terminals, the identification codes being contained in the wireless signals transmitted from the mobile terminals;
    terminal determination means for determining at least one mobile terminals providing a transmission level greater than a predetermined threshold value among the transmission levels acquired by the transmission level acquisition means; and
    selection means for selecting, in accordance with the identification codes acquired for the mobile terminals thus determined, mobile terminals having the identification code to be connected.

13. The wireless communications system according to claim 1, further comprising:
    identification code acquisition means for acquiring respective identification codes for a plurality of the mobile terminals, the identification codes being contained in the wireless signals transmitted from the mobile terminals;
    close terminal determination means for determining, as close mobile terminals, at least one mobile terminals providing a difference value less than a predetermined threshold value among the difference values calculated by the difference value calculation means; and
    selection means for selecting, in accordance with the identification codes acquired for the close mobile terminals thus determined, mobile terminals having the identification code to be connected.

14. The wireless communications system according to any one of claims 8 through 13, further comprising:
    transmission level reduction means for reducing a transmission level of a wireless signal to be transmitted to a mobile terminal at a relative distance, having been estimated by the relative distance estimation means, shorter than a predetermined distance among the mobile terminals selected by the selection means.

15. The wireless communications system according to any one of claims 8 through 13, further comprising:
    transmission level raise means for raising a transmission level of a wireless signal to be transmitted to a mobile terminal at a relative distance, having been estimated by the relative distance estimation means, longer than a predetermined distance among the mobile terminals selected by the selection means.

16. The wireless communications system according to claim 2, further comprising:
    writing control means for controlling the transmission level writing means to periodically write a transmission level into a second wireless signal.

17. The wireless communications system according to claim 4, further comprising:
    writing control means for controlling the reception level writing means to periodically write a reception level into a second wireless signal.

18. A wireless communication system, including a plurality of the wireless communications system similarly configured as the moblie receiver according to any one of claims 1 or 2 through 13, 16, and 17.

19. A wireless communications apparatus comprising:
    reception level acquisition means for acquiring respective reception levels of wireless signals transmitted from at least one mobile terminals, wherein the reception level acquisition means measures the respective reception levels of the wireless signals;
    transmission level acquisition means for acquiring respective transmission levels of the mobile terminal, wherein the transmission level acquisition means retrieves respective transmission levels of the mobile terminals contained in the wireless signals;
    difference value calculation means for calculating respective difference values between the transmission levels and the reception levels; and
    relative distance estimation means for estimating a relative distance to the mobile terminal in accordance with the respective difference values;

wherein
the reception level acquisition means retrieve respective reception levels of wireless signals sent from the wireless communications apparatus to the at least one mobile terminal contained in the wireless signals of the at least one mobile terminals; and the transmission level acquisition means measures a transmission level of the wireless communications apparatus to the at least one mobile terminals.

* * * * *